United States Patent [19]

Urbach

[11] Patent Number: 5,066,159
[45] Date of Patent: Nov. 19, 1991

[54] BALL JOINT WITH INTEGRAL SEAL

[75] Inventor: Brian A. Urbach, Rochester Hills, Mich.

[73] Assignee: TRW Inc., Lyndhurst, Ohio

[21] Appl. No.: 652,439

[22] Filed: Feb. 8, 1991

[51] Int. Cl.$^5$ ............................................. F16C 11/00
[52] U.S. Cl. .................................. 403/134; 403/135; 403/51; 277/212 FB
[58] Field of Search ................ 403/134, 135, 140, 50, 403/51; 277/212 FB

[56] References Cited

U.S. PATENT DOCUMENTS

| | | |
|---|---|---|
| 2,197,889 | 4/1940 | Katcher . |
| 3,027,182 | 3/1962 | Reuter . |
| 3,389,927 | 6/1968 | Herbenar ......................... 403/51 X |
| 3,472,331 | 10/1969 | Baker et al. ...................... 403/134 X |
| 4,386,869 | 6/1983 | Smith ............................. 403/134 X |

Primary Examiner—Andrew V. Kundrat
Attorney, Agent, or Firm—Tarolli, Sundheim & Covell

[57] ABSTRACT

A ball joint includes a socket defining a chamber and having an opening therein. A ball stud has a ball portion in the chamber and a shank portion projecting through the opening. A bearing supports the ball portion in the chamber. A seal member seals the opening between the socket and the ball stud. The seal member includes a shank seal portion for sealing against the ball stud shank, a retaining ring, and a socket seal portion for sealing against the socket. The retaining ring is molded in the socket seal portion of the seal member. The socket seal portion with the retaining ring molded therein is located in the chamber. An axial end portion of the socket holds the socket seal portion in position against the bearing and the inner surface of the socket. The retaining ring blocks movement of the ball portion out of the chamber through the opening.

13 Claims, 2 Drawing Sheets

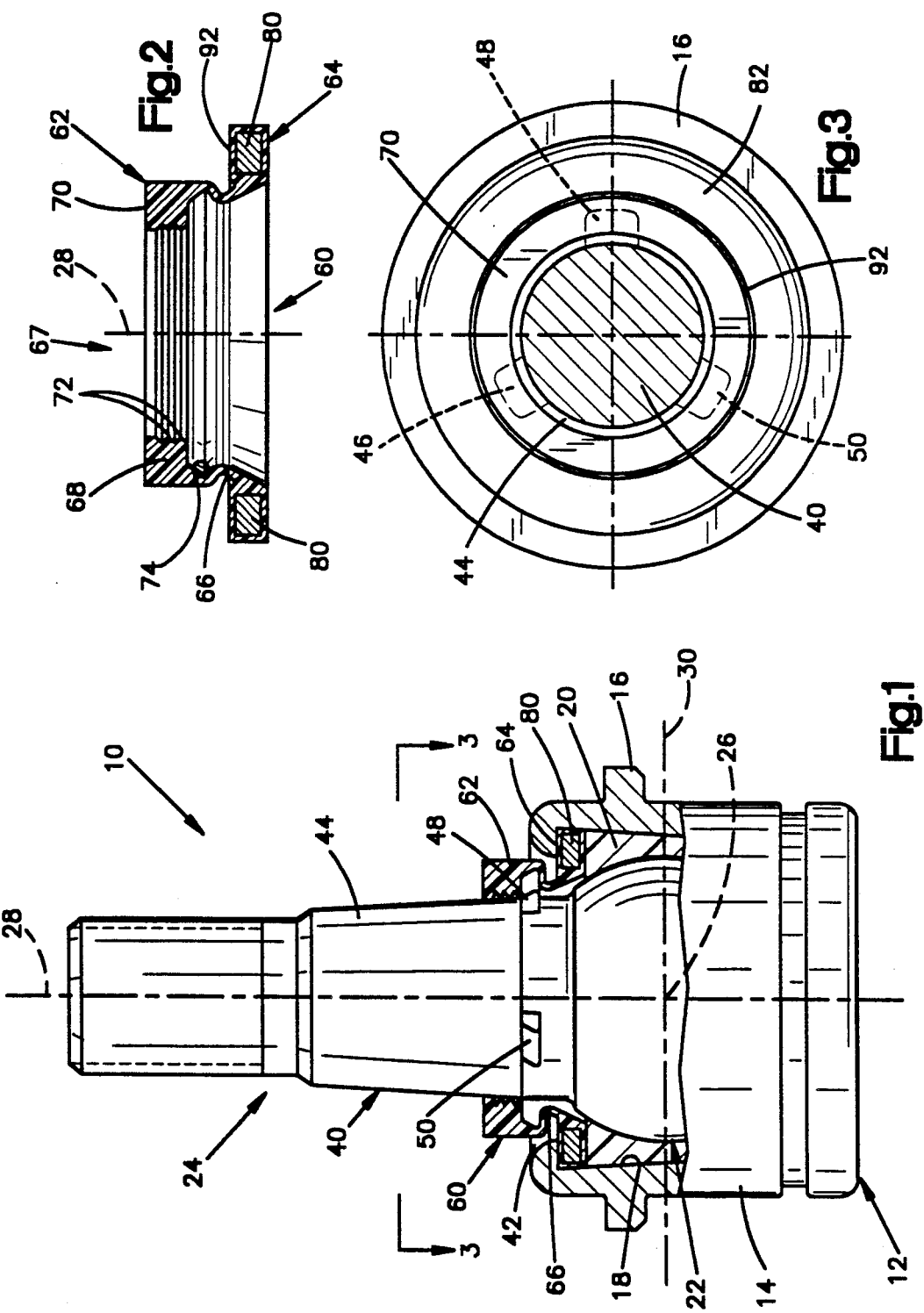

BALL JOINT WITH INTEGRAL SEAL

BACKGROUND OF THE INVENTION

1. Technical Field

The present invention relates to a ball joint for a motor vehicle suspension, and more particularly, to a seal for a ball joint.

2. Description of the Prior Art

A ball joint for a motor vehicle suspension commonly includes a socket and a ball stud. The ball stud has a ball portion located in the socket and a shank portion projecting through an opening in the socket. A bearing supports the ball portion in the socket for limited rotation and pivoting movement.

Ball joints commonly include a seal to seal the opening between the socket and the ball stud against the ingress of water, dirt and other contaminants which can accelerate bearing wear and joint failure. If the seal is exposed, it is prone to rips and punctures during assembly of the ball joint into mating parts of the vehicle suspension, as well as during the service life of the ball joint. Further, significant clearances must be provided in the vehicle around the area of the ball joint to ensure that the exposed seal does not wear on any adjacent surfaces. Moreover, certain of the known seals can be accidentally removed.

U.S. Pat. No. 3,027,182 to Reuter discloses a ball joint in which a seal for sealing the opening between a socket and ball stud extends from the shank of a ball stud and around the outer diameter of a retaining ring located in the socket. Part of the seal is disposed between the retaining ring and the socket.

SUMMARY OF THE INVENTION

The present invention is a ball joint comprising a socket defining a chamber and having an opening into the chamber. A ball stud has a ball portion in the chamber and a shank portion projecting through the opening. A bearing supports the ball portion in the chamber.

A seal member seals the opening between the socket and the ball stud. The seal member includes a shank seal portion for sealing against the ball stud shank, a retaining ring, and a socket seal portion for sealing against the socket. The retaining ring is molded in the socket seal portion of the seal member. The socket seal portion and the retaining ring are located in the chamber. The socket has a spun over portion which holds the retaining ring and socket seal portion in the chamber. A part of the socket seal portion provides a seal between the socket including the spun over portion and the retaining ring. Also, a part of the socket seal portion is located between the retaining ring and the bearing and provides a seal between them. The retaining ring blocks movement of the ball portion out of the chamber through the opening.

BRIEF DESCRIPTION OF THE DRAWINGS

Further features of the present invention will become apparent to those skilled in the art to which the present invention relates from reading the following specification with reference to the accompanying drawings, in which:

FIG. 1 is a view, partially in section, of a ball joint constructed in accordance with the present invention;

FIG. 2 is a transverse sectional view of the seal of the ball joint of FIG. 1;

FIG. 3 is a sectional view taken along line 3—3 of FIG. 1; and

DESCRIPTION OF A PREFERRED EMBODIMENT OF THE INVENTION

Figure 4:
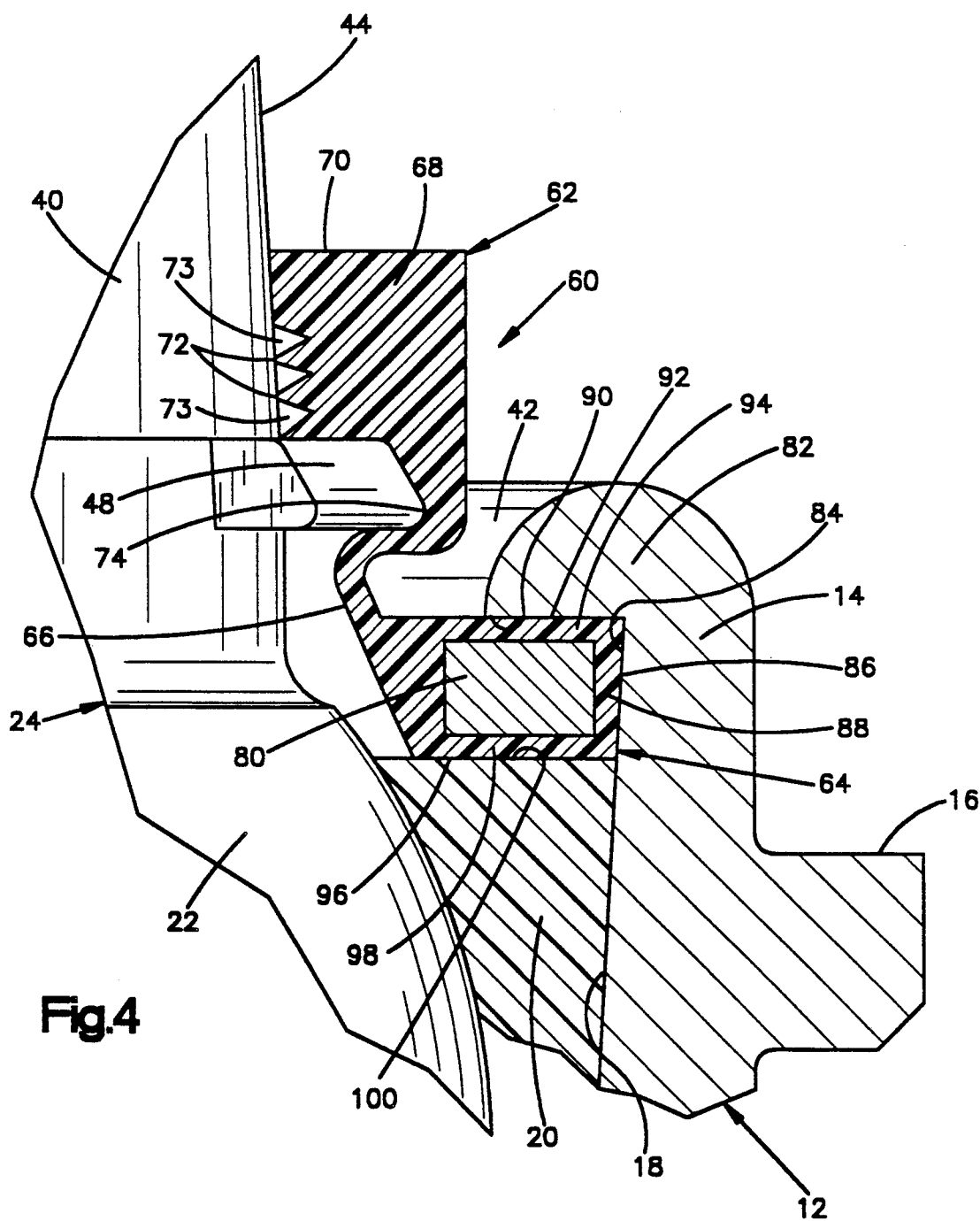
FIG. 4 is an enlarged view of a portion of FIG. 1.

A ball joint 10 constructed in accordance with the present invention is illustrated in FIG. 1. The ball joint 10 includes a rigid metal socket 12 having a generally cylindrical side wall 14 and a mounting flange 16. The socket 12 defines a socket chamber 18 within which is located a bearing 20. The socket 12 is preferably cold formed or screw machined from SAE grade 1008 or 1010 steel which is available from LTV Steel. The bearing 20 is preferably made of injection molded Delrin ® 500CL, 500 or 100 plastic which is available from E. I. DuPont de Nemours & Co.

The bearing 20 supports a spherical ball portion 22 of a ball stud 24. The bearing 20 supports the ball stud 24 for limited rotation and pivoting movement about a center of oscillation 26 which is the intersection of a longitudinal axis 28 and a transverse axis 30 of the ball stud 24. The center of oscillation 26 is coincident with the center of the spherical ball portion 22 of the ball stud 24. The ball stud 24 is preferably cold headed or screw machined and then carburized. The ball stud 24 is made of SAE grade 8115M or 8615 steel which is available from LTV Steel.

A shank portion 40 of the ball stud 24 projects through a circular opening 42 in the housing 12. Three projections 46, 48, and 50 project radially outwardly from the ball stud shank 40. Each of the projections 46, 48, and 50 extends about 30° circumferentially around the ball stud shank 40. The projections 46, 48, and 50 are spaced equally around the ball stud shank 40.

An annular seal member 60 seals the opening 42 between the ball stud 24 and the socket 12. The seal 60 includes a shank seal portion 62 and a socket seal portion 64 which are interconnected by a connector portion 66. The seal 60 has a passage 67 through which the ball stud shank 40 extends. The seal 60 is preferably made of Compound #1806-85A urethane available from Trostel.

The shank seal portion 62 (FIG. 2) of the seal 60 includes a widened section 68 partially defining the passage 67 and having an axial end face 70. A plurality of sealing lips 72 are formed on the annular radially inward face of the widened section 68. Adjacent sealing lips 72 define between them a series of grooves 73. The shank seal portion 62 as shown in FIG. 2 extends downwardly from the surface 70 and has an inwardly facing groove 74 adjacent the connector portion 66. The groove 74 extends circumferentially around the inside of the seal 60.

An annular metal retaining ring 80 is injection molded in the socket seal portion 64 of the seal 60. The retaining ring 80 is surrounded on all four sides by the elastomeric material of the socket seal portion 64. The retaining ring 80 is located in the chamber 18 in the socket 12. The retaining ring 80 has a rectangular cross sectional configuration. The retaining ring 80 is preferably made of quenched and tempered SAE grade 1055 or 1065 steel which is available from LTV Steel. The retaining ring 80 is preferably about 2 mm to 4 mm thick. For example, the retaining ring 80 in the illustrated embodiment has a thickness of about 2.4 mm.

In the assembled ball joint 10 (FIG. 4), the shank seal portion 62 of the seal 60 provides a seal against the outer surface of the ball stud shank 40. The inner diameter of the widened portion 68 of the shank seal portion 62, before assembly to the ball stud 24, is less than the outer diameter of the ball stud shank 40. The shank seal portion 62 stretches to fit elastically around the ball stud shank 40. The sealing lips 72 engage a tapered outer surface 44 of the ball stud shank 40. The projections 46, 48 and 50 on the ball stud 24 are received in the groove 74 of the seal 60. The projections 46, 48 and 50 position the shank seal portion 62 axially relative to the ball stud 24, and block axial movement of the shank seal portion 62 relative to the ball stud shank 40. No snap ring is needed to hold the shank seal portion 62 in place on the ball stud shank 40.

The grooves 73 in the annular radially inward face of the widened portion 68 reduce the amount of surface area of the shank seal portion 62 which engages the ball stud shank 24. Because of this reduced surface area, the sealing lips 72 seal against the ball stud shank 24 with greater pressure. Also because of this reduced surface area, there is less tendency for the shank seal portion 62 to rotate with the ball stud 24 when the ball stud 24 rotates.

The socket seal portion 64 of the seal 60 provides a seal against the inner surface of the socket 12. An axial end portion 82 of the socket 12 is spun over to hold the socket seal portion 64 in position against the bearing 20. The axial end portion 82 of the socket 12 partially defines the opening 42 in the socket 12.

Spinning the socket 12 closed presses the socket side wall 14 against the socket seal portion 64 of the seal 60. An inner surface 84 of the side wall 14 engages an outer surface 86 of a first section 88 of the socket seal portion 64. The first section 88 of the socket seal portion 64 is compressed radially inwardly. The metal retaining ring 80 because of its annular shape blocks radially inward movement of the first section 88 of the socket seal portion 64. The elastomeric material of the first section 88 of the socket seal portion 64 is trapped between the socket side wall 14 and the retaining ring 80. The surface 84 of the socket 12 engages the surface 86 of the seal 60 to seal between the retaining ring 80 and the side wall 14.

Spinning the socket 12 closed also presses the spun over portion 82 of the socket 12 axially inwardly against the socket seal portion 64. An axially inward surface 90 of the spun over portion 82 engages an axially outward surface 92 of a second portion 94 of the socket seal portion 64. The socket seal portion 64 is pressed axially inwardly against the bearing 20. An axially inward surface 96 of a third portion 98 of the socket seal portion 64, engages an axially outward facing surface 100 of the bearing 20. The bearing 20 prevents the socket seal portion 64 from moving axially inwardly. The elastomeric material of the socket seal portion 64 is trapped between the spun over portion 82 of the socket 12 and the retaining ring 80, and is also trapped between the retaining ring 80 and the bearing 20. The surface 90 on the socket 12 engages the surface 92 on the seal 60 to seal between the retaining ring 80 and the spun over portion 82 of the socket 12. The surface 96 on the seal 60 engages the surface 100 on the bearing 20 to seal between the retaining ring 80 and the bearing 20.

The retaining ring 80 serves a function to retain the ball stud 24 in the socket 12. The retaining ring 80 is needed because the ball stud 24 must be able to pivot by a certain amount within the socket 12, and if the opening 42 is large enough to accommodate this pivoting movement, then the opening 42 may be too large for the ball portion 22 of the ball stud 24 to be held in the socket 12 in the event of a strong pull-out force acting on the ball stud 24. The retaining ring 80 is dimensioned and located to prevent such an occurrence.

Specifically, the retaining ring 80 is located in the chamber 18 in the socket 12, inside the opening 42. The retaining ring 80 has an outside diameter which is greater than the inside diameter of the opening 42 in the socket 12. Thus, the axial end portion 82 of the socket 12 blocks movement of the retaining ring 80 out of the chamber 18 through the opening 42. For example, the retaining ring 80 in the illustrated embodiment has an outside diameter of about 34.1 mm, while the opening 42 in the illustrated embodiment is about 28 mm in diameter where the axial end portion 82 is closest to the ball portion 22. Also, there is preferably only about a 1 mm difference between the outer diameter of the retaining ring 80 and the inner diameter of the socket chamber 18.

Also, the retaining ring 80 has an inside diameter which is less than the outside diameter of the ball portion 22 of the ball stud 24. Thus, the retaining ring 80 blocks movement of the ball portion 22 out of the chamber 18 through the opening 42. The ball stud 24 is therefore held in place in the socket chamber 18 in the event of a strong pull-out force acting on the ball stud 24. For example, the retaining ring 80 in the illustrated embodiment has an inside diameter of about 27.4 mm, while the ball portion 22 is about 30 mm in diameter. There is preferably about a 2.5 mm to 3 mm difference between the inside diameter of the retaining ring 80 and the outside diameter of the ball portion 22.

Further, the socket seal portion 64 of the seal 60 is located in the chamber 18, inside the opening 42 in the socket 12. The socket seal portion 64 is clamped in the socket 12 by the axial end portion 82 of the socket 12. The seal 60 thus becomes an integral part of the ball joint 10. Removal of the seal 60 from the assembled ball joint 10 is therefore almost impossible.

The spun over portion 82 of the socket 12 also acts as a shield for the seal 60, minimizing the potential for damage to the seal 60 during assembly of the ball joint 10 into mating parts of a vehicle suspension. The spun over portion 82 also reduces the potential for damage to the seal 60 during the service life of the ball joint 10.

It should be noted that the ball joint 10 can be assembled in an opposite manner. Instead of spinning over the axial end portion 82 to close the socket 12, the ball joint 10 can be formed with the lower end portion of the socket 12, as viewed in FIG. 1, initially open, and with the axial end portion 82 of the socket 12 preformed in the shape shown to form an axially inwardly facing shoulder. The ball stud 24 having the seal 60 assembled thereto is then inserted through the open end portion of the socket 12 until the socket seal portion 64 of the seal 60 engages the axial end portion 82. The open end portion of the socket 12 is then closed, pressing the socket seal portion 64 against the shoulder 82 to effect the desired seal.

From the above description of the invention, those skilled in the art will perceive improvements, changes and modifications. Such improvements, changes and modifications within the skill of the art are intended to be covered by the appended claims.

I claim:

1. Apparatus comprising:

a socket defining a chamber and having an axial end portion defining an opening in said socket;

a ball stud having a ball portion in said chamber and a shank portion projecting through said opening;

a bearing supporting said ball portion in said chamber; and a seal member for sealing the opening between said socket and said ball stud, said seal member comprising:

a shank seal portion for sealing against said ball stud shank;

a retaining ring; and a socket seal portion for sealing against said socket, said socket seal portion having said retaining ring molded therein, a first part of said socket seal portion being located between said axial end portion of said socket and said bearing and providing a seal between them.

2. Apparatus as defined in claim 1 wherein a second part of said socket seal portion is located between said retaining ring and a side wall portion of said socket and providing a seal therebetween.

3. Apparatus as defined in claim 1 wherein said first part includes an outer seal section located between said retaining ring and said axial end portion and providing a seal between them and an inner seal section located between said retaining ring and said bearing and providing a seal between them.

4. Apparatus as defined in claim 1 wherein said socket seal portion of said seal member completely surrounds said retaining ring molded in said socket seal portion.

5. Apparatus as defined in claim 1 wherein said retaining ring is located in said chamber and has an outside diameter greater than the diameter of said opening and an inside diameter smaller than the diameter of said ball portion of said ball stud, said axial end portion of said socket blocking movement of said retaining ring out of said chamber and said retaining ring blocking movement of said ball portion out of said chamber.

6. Apparatus as defined in claim 1 wherein said shank seal portion is elastic and when unstretched has an inside diameter less than the outside diameter of said ball stud shank portion, said shank seal portion being stretched to resiliently engage said ball stud shank portion to provide a seal against an outer surface of said ball stud shank portion.

7. Apparatus as defined in claim 1 wherein said axial end portion is spun over to engage said socket seal portion to close said socket.

8. Apparatus for sealing an opening between a socket and a ball stud in a ball joint, the socket defining a chamber and having an axial end portion defining the opening in the socket, the ball stud having a ball portion in the chamber and a shank portion projecting through the opening, the ball joint including a bearing supporting the ball portion in the chamber, said apparatus comprising:

a shank seal portion for sealing against the ball stud shank;

a retaining ring; and a socket seal portion for sealing against the socket, said socket seal portion having said retaining ring molded therein, a part of said socket seal portion being located between the axial end portion of the socket and the bearing and providing a seal between them.

9. Apparatus as defined in claim 8 wherein said socket seal portion of said seal member completely surrounds said retaining ring molded in said socket seal portion, and said retaining ring is located in the chamber and has an outside diameter greater than the diameter of the opening and an inside diameter smaller than the diameter of the ball portion of the ball stud, the axial end portion of said socket blocking movement of said retaining ring out of the chamber and said retaining ring blocking movement of the ball portion out of the chamber.

10. Apparatus comprising:

a socket defining a chamber and having an axial end portion defining an opening;

a ball stud having a ball portion in said chamber and a shank portion projecting through said opening;

a bearing supporting said ball portion in said chamber; and a seal member for sealing the opening between said socket and said ball stud, said seal member comprising:

a shank seal portion for sealing against said ball stud shank;

a retaining ring; and a socket seal portion for sealing against said socket, said socket seal portion having said retaining ring molded therein, a first part of said socket seal portion being located between said axial end portion of said socket and said bearing and providing a seal between them;

said shank seal portion being elastic and when unstretched having an inside diameter less than the outside diameter of said ball stud shank portion, said shank seal portion being stretched to resiliently engage said ball stud shank portion to provide a seal against an outer surface of said ball stud shank portion; and said shank seal portion comprising a plurality of axially spaced annular sealing lips engaging said ball stud shank portion at axially spaced locations.

11. Apparatus as defined in claim 10 comprising at least one member projecting from said ball stud shank portion and received in a groove in said seal member to block axial movement of said shank seal portion relative to said ball stud shank portion.

12. Apparatus for sealing an opening between a socket and a ball stud in a ball joint, the socket defining a chamber and having an axial end portion defining the opening, the ball stud having a ball portion in the chamber and a shank portion projecting through the opening, the ball joint including a bearing supporting the ball portion in the chamber, said apparatus comprising:

a shank seal portion for sealing against the ball stud shank;

a retaining ring; and a socket seal portion for sealing against the socket, said socket seal portion having said retaining ring molded therein, a part of said socket seal portion being located between the axial end portion of the socket and the bearing and providing a seal between them;

said socket seal portion of said seal member completely surrounding said retaining ring molded in said socket seal portion, and said retaining ring being located in the chamber and having an outside diameter greater than the diameter of the opening and an inside diameter smaller than the diameter of the ball portion of the ball stud, the axial end portion of the socket blocking movement of said retaining ring out of the chamber and said retaining ring blocking movement of the ball portion out of the chamber; and said shank seal portion comprising a plurality of axially spaced annular sealing lips engaging the ball stud shank at axially spaced locations.

13. Apparatus as defined in claim 1 wherein said socket has a cylindrical side wall and wherein said socket seal portion includes a first surface portion for engaging and sealing against said cylindrical side wall of said socket and a second surface portion for engaging and sealing against said bearing.

* * * * *